(12) United States Patent
Kawano (10) Patent No.: US 6,380,591 B1
(45) Date of Patent: Apr. 30, 2002

(54) ELECTRODE WIRING BOARD SUBJECTED TO COUNTER MEASURE AGAINST STATIC ELECTRICITY AND DISPLAY DEVICE USING THE SAME

(75) Inventor: Hideo Kawano, Kobe (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/198,530

(22) Filed: Nov. 24, 1998

(30) Foreign Application Priority Data

Nov. 25, 1997 (JP) .............................. 9-323104

(51) Int. Cl.[7] .................. H01L 29/40; H01L 29/786; H01L 23/62
(52) U.S. Cl. .................. 257/359; 257/355; 257/72; 349/40
(58) Field of Search .................. 257/72, 359, 355; 349/40

(56) References Cited

U.S. PATENT DOCUMENTS 5,227,901 A * 7/1993 Iizuka .................. 349/40
5,521,728 A * 5/1996 Kodate .................. 349/40
5,677,745 A 10/1997 Kawano et al.

FOREIGN PATENT DOCUMENTS

| JP | 2-7019 | 1/1990 |
| JP | 8-62615 | 3/1996 |
| JP | 8-234227 | 9/1996 |
| JP | 8-236773 | 9/1996 |
| JP | 9-15623 | 1/1997 |
| JP | 9-33876 | 2/1997 |
| JP | 9-80469 | 3/1997 |

* cited by examiner

Primary Examiner—Jerome Jackson, Jr.
(74) Attorney, Agent, or Firm—Oblon, Spivak, McClelland, Maier & Neustadt P.C.

(57) ABSTRACT

A step portion is formed in an insulating layer provided between two opposing electrode layers outside a pixel electrode formation region, so that a projection portions are formed on the two electrode layers, wherein the shape of the projection portions of the electrode layers is of an electric-field concentration type to induce discharging between the opposing portions of the layers via the insulating layer.

7 Claims, 9 Drawing Sheets

ELECTRODE WIRING BOARD SUBJECTED TO COUNTER MEASURE AGAINST STATIC ELECTRICITY AND DISPLAY DEVICE USING THE SAME

BACKGROUND OF THE INVENTION

The present invention relates to an electrode wiring board having at least two electrode wiring layers formed to sandwich an insulating layer, and a display device using the same.

In recent years, as a display device using a liquid crystal, a display device or a liquid-crystal display (LCD) device which aims at a television display, a graphic display, and the like and has a large capacity and a high integration density is energetically developed and practically used. Not only a simple matrix type liquid-crystal display device which drives a liquid crystal by simply applying a voltage across a display electrode, i.e., a counter electrode and a display pixel electrode in a time sharing manner, but also a so-called an active matrix type in which a switching element is incorporated in each pixel to obtain a high-quality image has been developed in recent years and has been practically used.

In order to advance the spread of the active matrix type liquid-crystal display device, the price must be lowered by increasing a manufacturing yield.

Although there are several means for increasing the manufacturing yield, as one of them, a means for reducing a rate of generation of visible defects by electrostatic breakdown damage in the manufacturing steps can be brought. Conventional various measures are taken against the electrostatic breakdown damage.

In an active matrix type liquid-crystal display device subjected to the conventional counter measure against static electricity and using a thin film transistor as a switching element, the following method is known. That is, a ring-like conductive pattern called a short ring is arranged around a display cell formation region, so that all scanning lines, storage capacitance lines, and signal lines are rendered conductive.

Figure 15:
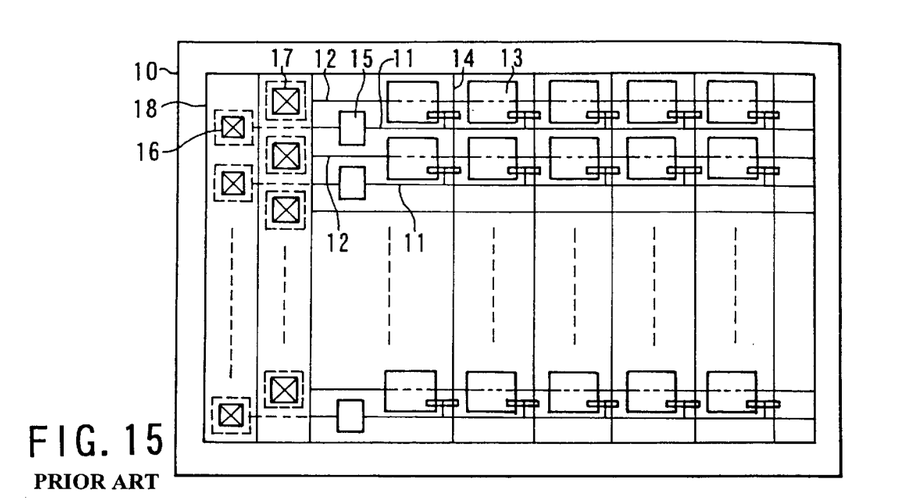
FIG. 15 is a view showing the electrode wiring structure of a conventional array substrate.

FIG. 15 is a plan view showing the outline of a conventional TFT array substrate in a state wherein a short ring is formed during a manufacturing step. Referring to FIG. 15, a plurality of scanning lines 11 and storage capacitance lines 12 are formed in a same layer on a glass substrate 10 such that each storage capacitance line 12 is arranged between the scanning lines 11 to be parallel to the scanning lines 11.

Pixel electrodes 13 arranged in a matrix are formed over the storage capacitance line 12 through an insulating film. After another insulating film is formed on the entire surface of the resultant structure, a plurality of signal lines 14 are formed in a direction traversing each the scanning line 11 and the storage capacitance line 12.

Scanning line test electrodes 15, feeding electrodes 16, and storage capacitance line test electrodes 17 are formed outside a pixel electrode formation region.

The scanning lines 11, the storage capacitance lines 12, and the signal lines 14 are electrically connected to each other on a stage in the manufacturing steps by a short ring 18 formed around a display cell formation region. The connection portions among the short ring 18, the scanning lines 11, the storage capacitance lines 12, and the signal lines 14 are cut off on the final stage of the manufacturing steps.

In this manner, when all the scanning lines 11, the storage capacitance lines 12, and the signal lines 14 are rendered conductive by the short ring 18, a TFT array substrate of the active matrix type liquid-crystal display device prevents a potential difference from being generated between the lines even if static electricity is charged after formation of the short ring. For this reason, electrostatic breakdown damage does not occur.

However, in fact, static electricity is frequently charged in the step before the step of forming the short ring. In this case, since a large potential difference is generated between lines, the electrostatic breakdown damage occurs in a wiring structure or an insulating film formed before the step of forming a short ring on the TFT array substrate.

For example, in the step before the step of forming the short ring 18 shown in FIG. 15, the scanning lines 11, the storage capacitance lines 12, and the test electrodes 15 and 17 connected to these lines are formed. Thereafter, a resist for performing a photoetching operation for forming another pattern is coated on the substrate 10, and heating is performed on the planar stage for evaporating the solvent of the resist.

Figure 16:
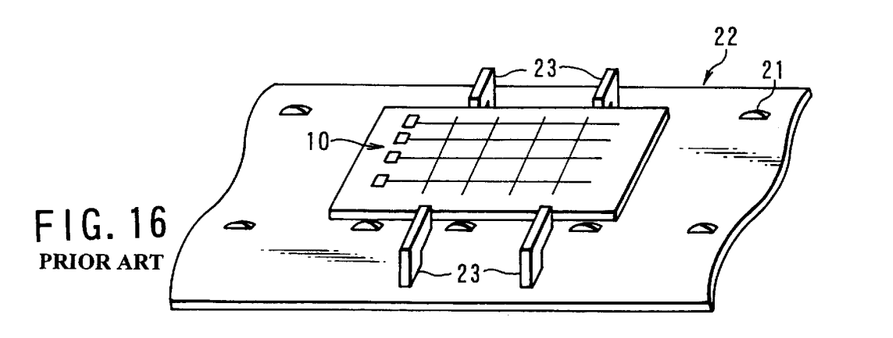
FIG. 16 is a perspective view showing a part of a device for manufacturing a conventional array substrate.

After the heating step, as shown in FIG. 16, the TFT array substrate 10 is moved on a conveyer belt 22 while being floated by a plurality of conveyer rollers 21 from the conveyer belt 22 to be conveyed to the next step. When the TFT array substrate 10 is conveyed while being floated by the plurality of convey rollers 21, static electricity of, e.g., several thousands volts is charged between the TFT array substrate 10 and the conveyer belt 22 by peeling charge.

In this case, as shown in FIG. 16, the conveying position of the TFT array substrate 10 is corrected by metal arms 23 connected to the conveyer belt 22. At this time, charges accumulated in the TFT array substrate 10 rapidly move toward the metal arm 23 by the contact between the metal arm 23 and the TFT array substrate 10, so that electrostatic breakdown damage occurs in the wiring structure or insulating film of the TFT array substrate 10.

Figure 17:
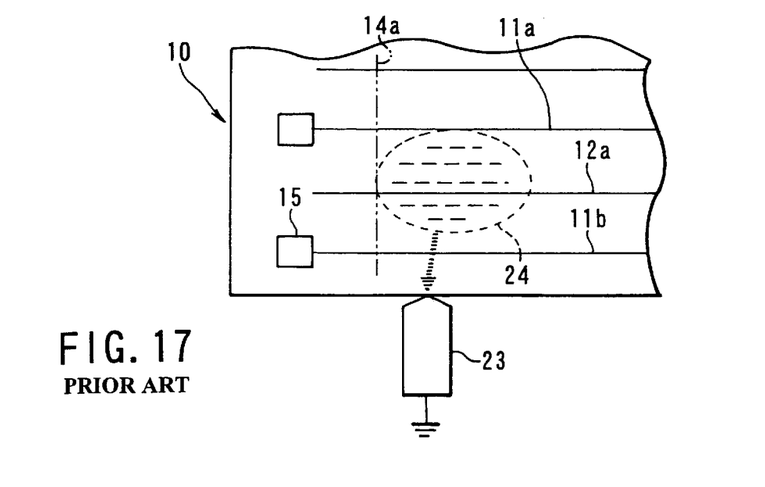
FIG. 17 is a view showing a discharging state of static electricity in the array substrate shown in FIG. 16.

More specifically, as shown in FIG. 17, in a state wherein a region 24 serving as a part of the TFT array substrate 10 is charged by negative static electricity of several thousands volts, when the grounded metal arm 23 is brought into contact with the region 24, the negative charges rapidly move from the region 24 of the TFT array substrate 10 to the metal arm 23 to cause discharging to occur.

At this time, electrostatic charges on a scanning line 11a or a storage capacitance line 12a arranged at a position near the charge region 24 of the TFT array substrate 10 transmits a scanning line 11b arranged between the scanning line 11a or the storage capacitance line 12a and the metal arm 23 rapidly, so that the charges rapidly move in an insulating film such as an insulating interlayer or a thin film semiconductor layer 26 in a discharging state.

Here, in FIG. 17, the position of a signal line 14a to be formed in the subsequent; step is indicated by a two-dash line. Therefore, when such discharging occurs after the signal line 14a is formed, charges may flow from the scanning line 11a or the storage capacitance line 12a to the metal arm 23 through the signal line 14a. As a result, the insulating states between the scanning line 11a and the signal line 14a and between the storage capacitance line 12a and the signal line 14a are broken.

Figure 18:
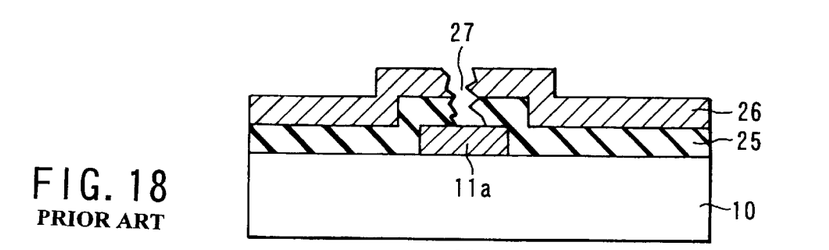
FIG. 18 is a sectional view showing the state of discharge breakdown damage occurring when discharging is generated between electrodes of a laminated structure.
Figure 19:
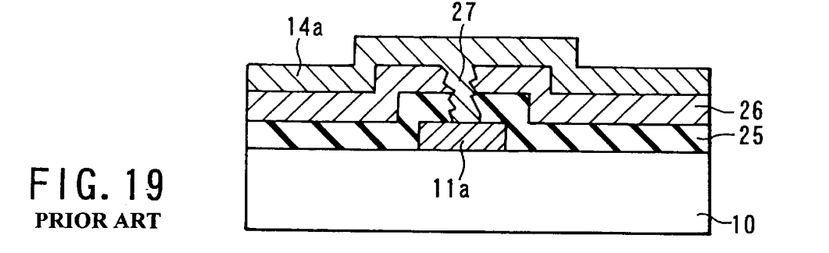
FIG. 19 is a view showing a state wherein a conductor is inserted into the discharge-damaged portion formed in FIG. 18.

As the result of the discharging, as shown in FIG. 18, discharging occurs between the scanning line 11a and the metal arm 23 shown in FIG. 17, and a pinhole-like or crack-like damaged portion 27 is formed by the electrostatic breakdown along the discharging, in the insulting film 25 and thin film semiconductor layer 26 formed on the scanning line 11a. When the signal line 14a is formed on the damaged portion 27 in the subsequent step, as shown in FIG. 19, the signal line 14a and the scanning line 11a are short-circuited to each other through the damaged portion 27. For this reason, a visible defect such as a line defect occurs in a pixel array during a display operation upon completion of the display device.

There is provided an active matrix type liquid-crystal display device which is subjected to a counter measure against electrostatic breakdown damage by forming discharging projections in an electrode wiring layer adjacent to each other without using a short ring.

For example, as disclosed in U.S. Pat. No. 5,677,745, a display device having the following arrangement is known. That is, a TFT is used as a switching element, and a signal line is constituted by a laminated structure including at least a semiconductor layer and a metal layer. The outer shapes of the respective layers are almost equal to each other, and a display pixel electrode is located on the uppermost layer. Test electrodes for a scanning line and an storage capacitance line are located at opposing positions, and projections for inducing discharging of static charges between the scanning and capacitive lines are formed.

Figure 22:
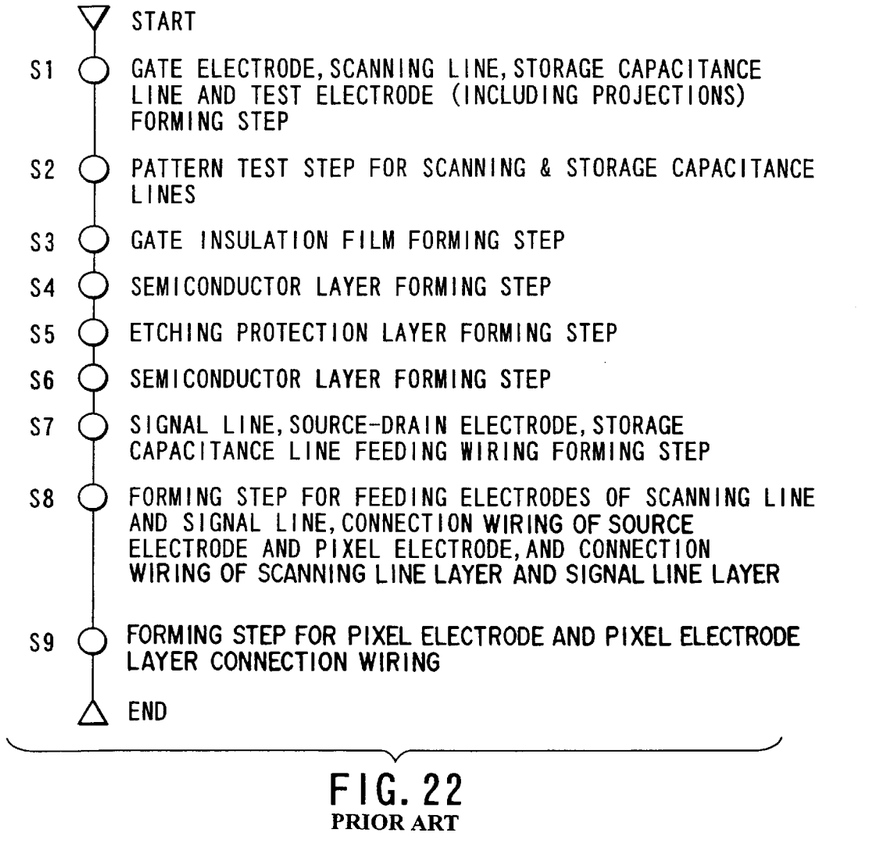
FIG. 22 is a flow chart showing the steps in manufacturing the array substrate shown in FIG. 20.
Figure 23:
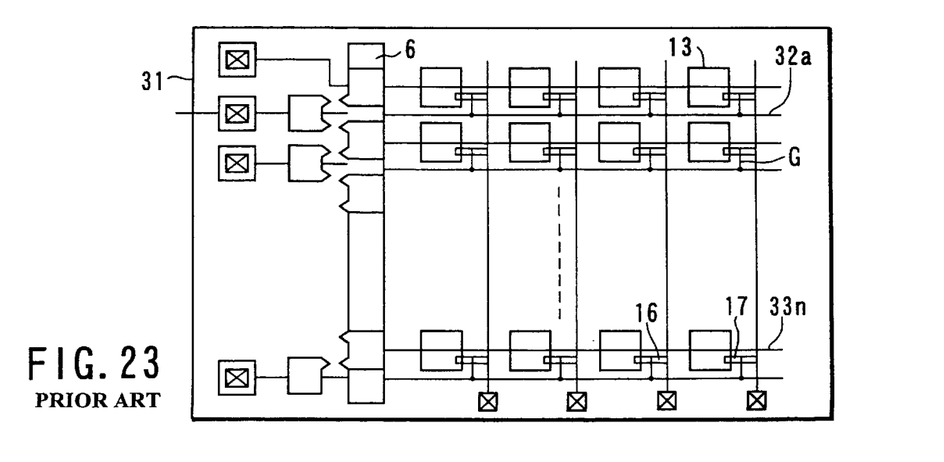
FIG. 23 is a plan view showing the outline of the array substrate in the final step of the manufacturing steps shown in FIG. 22.

This prior art will be described below according to a manufacturing process shown in FIG. 22 with reference to FIGS. 20, 21 and 23.

Figure 20:
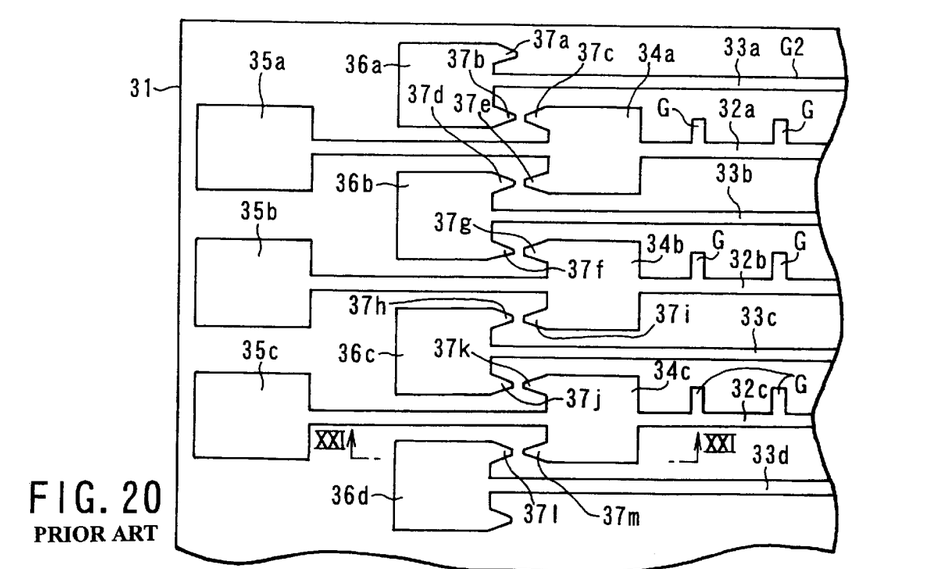
FIG. 20 is a plan view of an array substrate to show one conventional method of preventing discharge breakdown damage.

In the first step S1, after a Ta film is formed on an insulating substrate 31 by a sputtering method to have a thickness of 3,000 angstrom (A), as shown in FIG. 20, gate electrodes G, scanning lines 32a to 32c, storage capacitance lines 33a to 33c, and test electrodes 34a to 34c and 36a to 36d connected to the lines and having projections 37a to 37l for inducing discharging static electricity are processed by photo-etching to have predetermined shapes.

Figure 21:
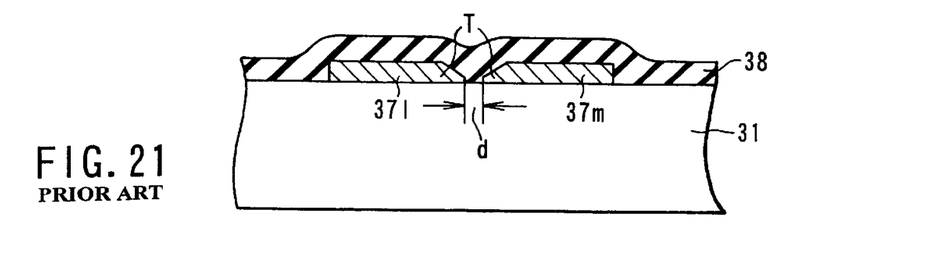
FIG. 21 is a sectional view showing a part of an internal structure of the array substrate shown in FIG. 20 along a line XXI—XXI.

FIG. 21 shows a sectional view obtained by cutting the structure along a 21—21 line in FIG. 20 when viewed in a direction indicated by arrows. Referring to FIG. 21, a gap d between the electrodes 37l and 37m is a portion operating as a discharging gap, and its size is set such that discharging is caused by a high voltage of several thousands volts generated by static electricity generated across the gap in the manufacturing step, but discharging is not caused by a voltage of several tens volts at most applied in an ordinary use state after the device is shipped as a product.

After a pattern test for the scanning lines and the storage capacitance lines are performed in step S2, a first insulating film consisting of SiN and having a thickness of 4,000A and an a-Si (amorphous-silicon) film serving as a TFT channel region and having a thickness of 1,000A are formed on the entire surface of the substrate 31 by a CVD (Chemical Vapor Deposition) method in steps S3 and S4.

After an etching protective film for a TFT channel consisting of SiN is formed by the same CVD method in step S5 to have a thickness of 2,000A, only the protective film is processed by photo-etching to have a predetermined pattern shape.

An n$^+$-type a-Si film is formed by the CVD method to have a thickness of 1,000A in step S6, and a film is formed by an Al (aluminum) sputtering method to have a thickness of 5,000A. Thereafter, the a-Si film, the n$^+$-type a-Si film, and the Al film are processed by photo-etching to have predetermined shapes, thereby forming a TFT channel, source and drain electrodes, a signal line, an storage capacitance line feeding wiring, and another signal line layer.

A second insulating film consisting of SiN is formed by a CVD method to have a thickness of 2,000A. The first and second insulating films are processed by photo-etching to have predetermined shapes in step S8, thereby exposing feeding electrodes for scanning lines, storage capacitance lines, and signal lines, forming connection means of a source electrode and a display pixel electrode, and forming connection means of a scanning line layer and a signal line layer.

After an ITO film is formed on the entire surface of the substrate by sputtering to have a thickness of 1,000A in step S9, the display pixel electrode 13, and the pixel electrode layer connection wiring are processed by photo-etching to have a predetermined shape. A plan view of the outline of the electrode wiring board obtained at this time is shown in FIG. 23. In this manner, an array substrate is completed.

When the above-mentioned array substrate having the short ring is used in an LCD device without any change, the short ring hinders a display operation. For this reason, all the short rings must be cut off. In addition, cut off of the short ring is not performed after the display device is completed but is performed during the manufacturing step of the display device, i.e., when the array substrate is completed. Therefore, a visible defect caused by electrostatic breakdown cannot be prevented from occurring after the cutting off.

A method of forming discharging projections between the electrode wirings is relatively easily realized between the electrode wirings formed on, so called, the same layer formed in one step. However, when two electrode wirings are formed in different steps, and an insulating interlayer or the like is formed between the two electrode wirings, it is very difficult to specially form an electric connection for preventing discharging from being generated between the electrode wirings.

In conventional manufacturing steps, since an array substrate is formed through the step of forming a scanning line layer (S1), the insulating film forming step (S3), the signal line layer forming step (S4), the protective film forming step (S5), the insulating film processing step for forming various electrodes, and the pixel electrode layer forming step (S9) in the order named, it is difficult to directly electrically connect a scanning line layer formed first to a signal line layer subsequently formed because a conductive film or an insulating film is formed between the scanning line layer and the signal line layer.

For example, in order to electrically connect both the layers to each other, the layers must be connected to each other through the connection wiring of the pixel electrode layer formed on the uppermost layer in the final step (S9). For this reason, in the step before the pixel electrode layer is formed, the scanning line layer and the signal line are electrically insulated from each other. As a result, when the substrate 31 is charged by static electricity in the steps performed from the step of forming a scanning line layer (S1) to the step of forming a pixel electrode layer (S9), electrostatic breakdown damage caused by discharging of static charges easily occurs between the scanning line layer 32a and a signal line 6, as shown in FIG. 23.

It is, therefore, an object of the present invention to provide an electrode wiring board in which, dielectric breakdown between two electrode wirings formed on an insulating substrate in different steps of manufacturing steps can be prevented in a subsequent manufacturing step, and a manufacturing yield can be increased and a display device using the electrode wiring board.

BRIEF SUMMARY OF THE INVENTION

An electrode wiring board according to the present invention comprises an insulating substrate, a first electrode wiring formed on the insulating substrate, an insulating layer formed on the first electrode wiring, and a second electrode wiring formed on the insulating layer, wherein the first and second electrode wirings have discharging portions located at positions which oppose through the insulating layer.

A display device according to the present invention includes: a pixel electrode array substrate having a plurality of scanning lines formed on an insulating substrate, an insulating layer formed on the scanning lines, signal lines arranged on the insulating layer arranged in a direction crossing to that of the scanning lines each other, and pixel electrodes arranged in each crossing point formed by the plurality of scanning lines and the signal lines crossing to each other through the insulating layer; a counter substrate opposing the pixel electrode array substrate; and a light modulation layer held between the pixel electrode array substrate and the counter substrate, wherein discharging portions are formed at parts of the scanning lines and the signal lines which oppose through the insulating layer in a region outside a region in which the pixel electrodes are formed.

With the above arrangement, electrostatic breakdown damage caused by discharging of electrostatic charges accumulated in steps performed from the step of forming a scanning line layer to the step of forming a pixel electrode layer in the region, in which the pixel electrode is formed, between the two electrode wirings, which are formed on the insulting substrate in different steps of the manufacturing steps, e.g., the scanning line layer and the signal line layer can be suppressed, and a manufacturing yield can be improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The first embodiment in which the present invention is applied to a liquid-crystal display device will be described below with reference to the accompanying drawings.

Figure 1:
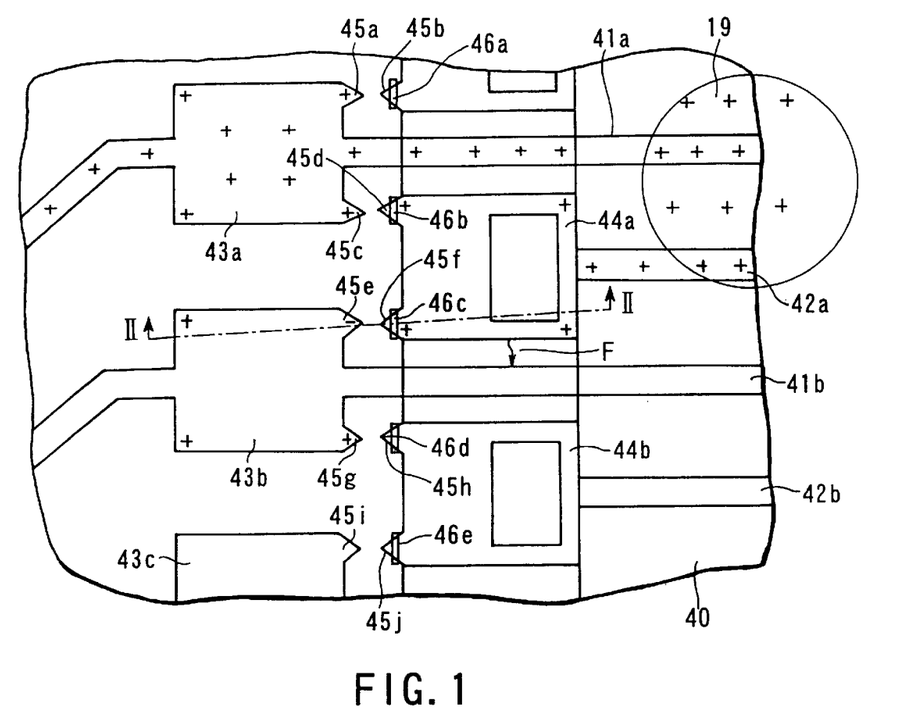
FIG. 1 is a plan view showing a planar structure in a manufacturing step of an array substrate according to one embodiment of this invention.
Figure 2:
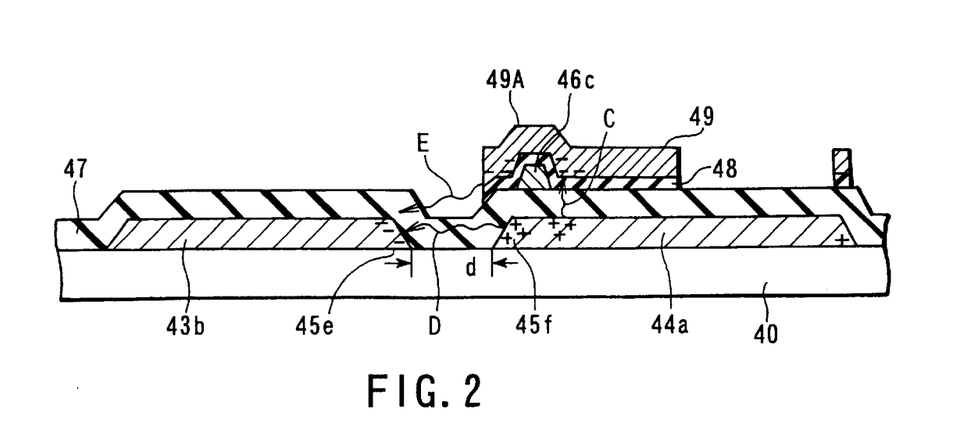
FIG. 2 is a sectional view showing a sectional structure of an array substrate along a line II—II of FIG. 1 in the step subsequent to the step in FIG. 1.

FIG. 1 is a plan view showing a part of a subassembly in a manufacturing step of an array substrate of the liquid-crystal display device according to this embodiment, and FIG. 2 is a sectional view showing the semi-assembly cut along a II—II line in FIG. 1 when viewed in the direction of the arrows.

Scanning lines 41a and 41b and storage capacitance lines 42a and 42b are alternately and parallelly formed on the surface of a glass substrate 40. Scanning line test electrodes 43a and 43b which are widely formed to have rectangular shapes are arranged near one-ends of the scanning lines 41a and 41b. Similarly, storage capacitance line test electrodes 44a and 44b which are widely formed to have rectangular shapes are also arranged at one-ends of the storage capacitance lines 42a and 42b. Although the scanning lines 41a and 41b are formed by using, e.g., Ta, the scanning lines 41a and 41b may also be formed by using MoTa, AlNd, or the like.

Pairs of discharging projections 45a to 45j are respectively formed on both of the end portions of opposing end faces of the scanning line test electrodes 43a and 43b and the storage capacitance line test electrodes 44a and 44b.

Insulating projection portions 46a to 46e are respectively formed on the discharging projections 45b, 45d, 45f, 45h, and 45j formed on the storage capacitance line test electrodes 44a and 44b with an insulation layer 47 of FIG. 2 inserted therebetween. Each of the insulating projection portions 46a to 46e has a shape having an almost rectangular section whose long side extends in a direction traversing a straight line along a pair of opposing discharging projections 45e and 45f, for example.

FIG. 2 is a sectional view showing a selected part of the array substrate cut along a line II—II passing through the discharging projection 45e formed on the scanning line test electrode 43b and the discharging projection 45f formed on the storage capacitance line test electrode 44a. The manufacturing step in FIG. 2 is the step performed several steps after the manufacturing step in FIG. 1.

Referring to FIG. 2, the scanning line test electrode 43b and the storage capacitance line test electrode 44a formed on the glass substrate 40 are entirely covered with an insulation SiO film 47, and, on the upper surface of the SiO film 47, the insulating projection portion 46c is formed at a portion corresponding to the discharging projection 45f formed on the storage capacitance line test electrode 44a. The other insulating projection portions 46a, 46b, 46d, and 46e are also formed in correspondence with the discharging projections 45b, 45d, 45h, and 45j to have the above positional relationships.

Referring to FIG. 2, an insulating film 48 is formed to cover the insulating projection portion 46c formed on the SiO film 47, and a storage capacitance line feeding wiring 49 is formed on the insulating film 48. The storage capacitance line feeding wiring 49 has a width which is almost equal to that of each of the storage capacitance line test electrodes 44a and 44b, and is continuously formed in a direction almost perpendicular to the scanning lines 41a and 41b and the storage capacitance lines 42a and 42b.

As described above, each of the insulating projection portions 46a to 46e has a shape having an almost rectangular section whose long side extends in the direction traversing the straight line along a pair of opposing discharging projections. For this reason, the edge portion of the step portion of the storage capacitance line feeding wiring 49 formed on the insulating projection portions 46a to 46e has long portions opposing the discharging projections 45a, 45c, 45e, 45g, and 45i. Therefore, discharging easily occurs.

As shown in FIG. 2, when a charged portion 19 charged by positive static electricity is formed in a pixel electrode formation region, as shown in FIG. 1, in the manufacturing step in which the storage capacitance line feeding wiring 49 is formed, the positive charges are distributed in the scanning line 41a, the scanning line test electrode 43a, the storage capacitance line 42a, and storage capacitance line test electrode 44a.

As a result, negative charges of several thousands volts are generated by electrostatic induction on the storage capacitance line feeding wiring 49 opposing the storage capacitance line test electrode 44a through the insulating film 48, an electric field is concentrated on the edge portion of the step portion formed on the lower surface of the storage capacitance line feeding wiring 49, and discharging occurs between the storage capacitance line feeding wiring 49 and the storage capacitance line test electrode 44a through a discharging path C.

This discharging eliminates the charged portion 19 charged by positive static electricity accumulated in the pixel electrode formation region. Since the discharging path C passes through the insulating film 48 and the SiO film 47, a pin hole is formed in the discharging path C. However, since this pin hole has been covered with the storage capacitance line feeding wiring 49, a conductor is not inserted into the pin hole in the subsequent manufacturing steps not to form an unnecessary conductive path.

As shown in FIGS. 1 and 2, since positive charges exist in the storage capacitance line test electrode 44a, negative charges are also generated by electrostatic induction on the discharging projection 45e of the scanning line test electrode 43b, and discharging occurs through a discharging path D.

Even if static electricity is generated in the pixel electrode formation region in a manufacturing step as described above, electrostatic charges are immediately discharged through a discharging path formed around the pixel electrode formation region. For this region, discharging can be prevented from occurring at a position where a manufacturing yield is decreased.

When static electricity is accumulated in the storage capacitance line feeding wiring 49 for some reason, a high potential difference is generated between the storage capacitance line feeding wiring 49 and the electrode 44a opposing the storage capacitance line feeding wiring 49, and a high potential difference is generated between the storage capacitance line feeding wiring 49 and the electrode 43b. For this reason, as shown in FIG. 2, an electric field is concentrated on the edge portion of the lower end of a step portion 49A of the storage capacitance line feeding wiring 49 on the side facing the electrode 43b, and discharging occurs through a discharging path E.

Figure 3:
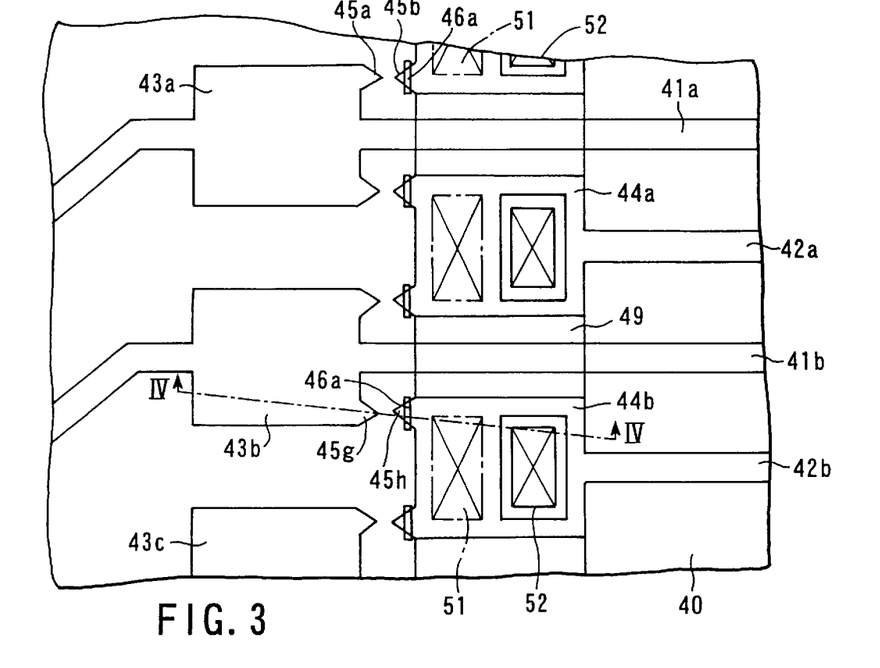
FIG. 3 is a plan view showing a planar structure of an array substrate in a subsequent step of the manufacturing step in FIG. 2.
Figure 4:
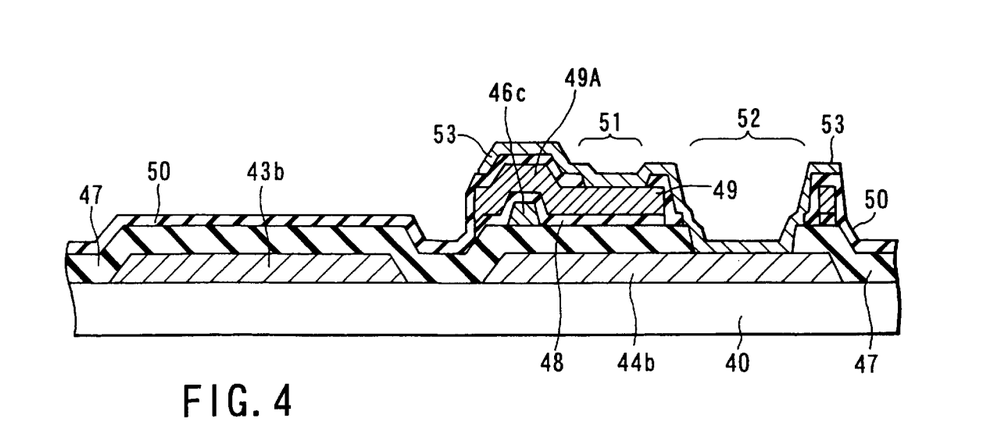
FIG. 4 is a sectional view showing a sectional structure of an array substrate along a line IV—IV of FIG. 3 in the subsequent step of the step in FIG. 3.

FIGS. 3 and 4 are plan and sectional views of a wiring electrode substrate in the step subsequent to the manufacturing step shown in FIGS. 1 and 2. After the storage capacitance line feeding wiring 49 is formed in the step in FIG. 2, an insulating protective film 50 is covered on the entire surface of the storage capacitance line feeding wiring 49, and first contact holes 51 are formed in portions which are parts of the surface of the storage capacitance line feeding wiring 49 and correspond to the storage capacitance line test electrodes 44a and 44b.

Second contact holes 52 are formed in portions which are adjacent to the first contact holes 51 and correspond to the storage capacitance line test electrodes 44a and 44b. The first contact hole 51 removes the protective film 50 to expose the surface of the storage capacitance line feeding wiring 49, and the second contact hole 52 removes the insulating film 47 to expose the surface of the storage capacitance line test electrode 44b.

After the first and second contact holes 51 and 52 are formed, pixel electrode layer connection wirings 53 are formed in the contact holes 51 and 52. Up to this step, the storage capacitance line feeding wiring 49 is connected to the storage capacitance line test electrode 44b through the pixel electrode layer connection wiring 53, and the discharging path C described in FIG. 2 becomes unnecessary.

Figure 6:
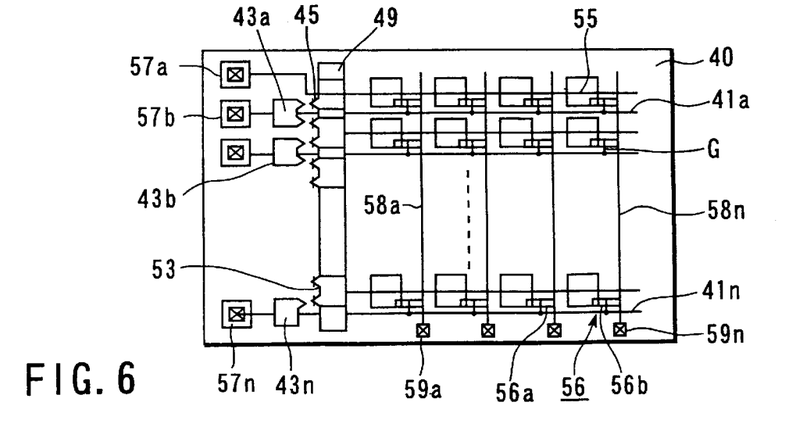
FIG. 6 is a view showing the outline of the planar structure of the array substrate in the final step of the manufacturing steps in FIG. 5.

Through the above steps, finally, an electrode wiring board having the arrangement shown in FIG. 6, i.e., an array substrate of a liquid-crystal display device is formed. In FIG. 6, a plurality of pixel electrodes 55 are arranged in a matrix in a display region on the substrate 40. The pixel electrodes 55 are connected to a plurality of signal lines 58a to 58n arranged in a direction perpendicular to scanning lines 41a to 41n, through TFT elements 56, respectively. The gates G of the TFT elements 56 are connected to the plurality of scanning lines 41a to 41n. One-ends of the scanning lines 41a to 41n are connected to a plurality of pads 57a to 57n formed outside the display region, through scanning line test electrodes 43a to 43n.

One-ends of the plurality of signal lines 58a to 58n are connected to a plurality of pads 59a to 59n arranged outside the display region.

Figure 5:
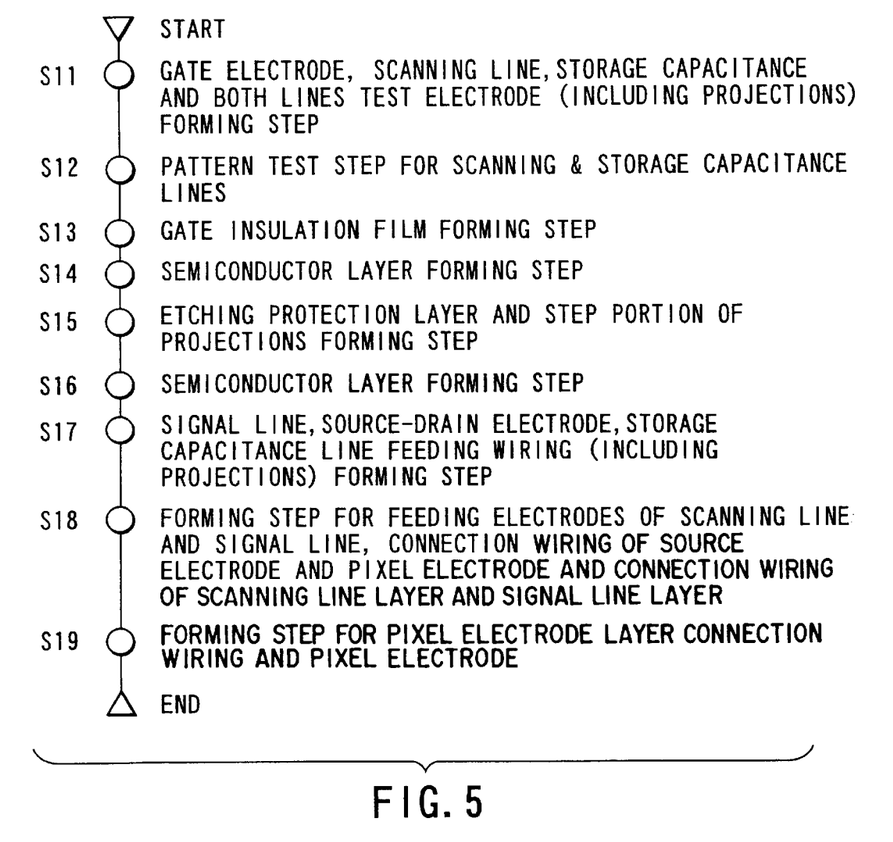
FIG. 5 is a chart showing the flow of manufacturing steps of the array substrate according to an embodiment of the present invention.

The manufacturing steps of an electrode wiring board having the arrangement described in FIGS. 1 to 4 and FIG. 6 will be described below with reference to FIG. 5.

In the first step S11, after a Ta film is formed on an insulating substrate 41 by sputtering method to have a thickness of 3,000A, the scanning lines 41a and 41b, the storage capacitance lines 42a and 42b, and the test electrodes 43a to 43c and 44a and 44b connected to both the lines and having the discharging projections 45a to 45j for inducing discharging of static electricity charged on opposing positions are processed to have predetermined shapes. Here, MoTa, AlNd, or the like may be used in place of Ta.

FIG. 2 is a sectional view showing the structure cut along a II—II line in FIG. 1 when viewed in the direction of arrows. Referring to FIG. 2, a gap d between the electrodes 43b and 44a is a portion operating as a discharging gap, and, as described above, its size is set such that discharging is caused by a high voltage of several thousands volts generated by static electricity across the gap in the manufacturing step, but discharging is not caused by a voltage of several tens volts at most generated in an ordinary use state after the device is shipped as a product.

In FIG. 2, the scanning line test electrode 43b and the storage capacitance line test electrode 44a formed on the glass substrate 40 are entirely covered with the SiO film 47, and, on the upper surface of the SiO film 47, the insulating projection portion 46c is formed on a portion corresponding to the discharging projection 45f formed on the storage capacitance line test electrode 44a. The insulating projection portions 46a, 46b, 46d, and 46e are also formed in correspondence with the discharging projections 45b, 45d, 45h, and 45j to have the above positional relationships.

Referring to FIG. 2, the insulating film 48 is formed to cover the insulating projection portion 46c formed on the SiO film 47, and a storage capacitance line feeding wiring 49 is formed on the insulating film 48. The storage capacitance line feeding wiring 49 has a width which is almost equal to that of each of the storage capacitance line test Electrodes 44a and 44b, and is continuously formed in a direction almost perpendicular to the scanning lines 41a and 41b and the storage capacitance lines 42a and 42b.

As described above, each of the insulating projection portions 46a to 46e has a shape having an almost rectangular section whose long side extends in the direction traversing the straight line along a pair of opposing discharging projections. For this reason, the edge portion of the step portion of the storage capacitance line feeding wiring 49 formed on the insulating projection portions 46a to 46e has long portions opposing the discharging projections 45a, 45c, 45e, 45g, and 45i. Therefore, discharging easily occurs.

After a pattern test for the scanning lines and the storage capacitance lines are performed in step S12, a first insulating film consisting of SiN and having a thickness of 4,000A is formed as a gate insulating film in steps S13 and S14, and an a-Si film serving as a TFT channel region and having a thickness of 1,000A is formed on the entire surface of the substrate 40 by a CVD (Chemical Vapor Deposition) method.

After an etching protective film for a TFT channel consisting of SiN is similarly formed by the CVD method in step S15 to have a thickness of 2,000A, only the protective film is processed by photo-etching to have a predetermined shape. In the step of forming the etching protective film for the channel, the insulating projection portion 46c shown in FIG. 2 is formed on the SiN film 47. The insulating projection portion 46c is a pattern for forming the step portion 49A on the storage capacitance line feeding wiring 49 in the subsequent step. The height of the projection member, i.e., the step portion 46c is set to be 1,000A or more, desirably, a value falling the range from 2,000A to 3,300A.

A plan view showing the outline of the insulating substrate 40 on which the insulating projection portion 46 (46a to 46e) is formed at this time is shown in FIG. 1.

An $n^+$-type a-Si film is formed by the CVD method to have a thickness of 1,000A in step S16, and an aluminum film is formed by an aluminum (Al) sputtering method to have a thickness of 5,000A. Thereafter, the a-Si film, the $n^+$-type a-Si film, and the Al film are processed by photo-etching to have predetermined shapes, thereby in FIG. 6 forming the channel of the TFT 56, and a source electrode 56a, a drain electrode 56b, signal lines 58a to 58n, and a storage capacitance line feeding wiring 49, using a signal line layer in step S17. At this time, as shown in the sectional view in FIG. 2, the step portion 49A is formed on a part of the storage capacitance line feeding wiring 49. The signal line layer is formed by using, in addition to Al, a laminated structure consisting of Mo/Al/Mo, an Mo single layer, or AlNd.

A second insulating film consisting of SiN is formed by the CVD method to have a thickness of 2,000A. The first and second insulating films 47, 50 are processed by photo-etching to have predetermined shapes in step S18, thereby exposing feeding electrodes for scanning lines, storage capacitance lines, and signal lines, forming connection means of a source electrode and a pixel electrode, and forming connection means of a scanning line layer and a signal line layer.

Finally, after an ITO film serving as a transparent electrode is formed on the entire surface of the substrate by sputtering to have a thickness of 1,000 A in step S19, the pixel electrode 55 and the pixel electrode layer connection wiring 53 are processed by photo-etching to have a predetermined shape. The transparent electrode may also be formed by using, in addition to the ITO film, InZnO or amorphous ITO. When the amorphous ITO is used, an oxalic acid which does not corrode Al is used as an etching solution for the amorphous ITO. For this reason, Al is desirably used as the material of the signal lines.

In this manner, an array substrate is completed.

It is popularly known that a charge distribution in the conductor is concentrated on a portion having a small radius of curvature. For this reason, charges between the scanning line test electrode 43b and the storage capacitance line test electrode 44a or charges between the scanning line test electrode 43b and the storage capacitance line feeding wiring 49 are concentrated on the projection portions thereof as shown in FIG. 2. As a result, strong electric fields are formed between the opposing projections 45e and 45f and between the step portions 49A, so that discharging easily occurs.

As a result, as indicated by the discharging paths C, D, and E, electrostatic charges concentrated between the step portion 49A of the storage capacitance line feeding wiring 49 and the scanning line test electrode 43b or the storage capacitance line test electrode 44a are easily discharged, so that unexpected discharging at an opposing portion between the scanning line 41b and the storage capacitance line test electrode 44a as indicated by a discharging path F in FIG. 1 is suppressed.

As shown in FIGS. 1 and 2, this also occurs in the same manner as described above in the steps performed from formation of the storage capacitance line feeding wiring 49 electrically insulated from a scanning line layer 41b to formation of the pixel electrode layer connection wiring 53 shown in FIG. 4.

In particular, by forming the step portion 49A on the storage capacitance line feeding wiring 49, as shown in FIG. 2, charges are concentrated on the step portion 49A. For this reason, an electric field in a direction perpendicular to the insulating substrate 40 becomes strong. As a result, on the step portion 49A, discharging easily occurs between the scanning line layer 43b and the storage capacitance line feeding wiring 49 as indicated by discharging paths C and E in FIG. 2.

Depending on a means for forming the step portion 49A, the quality of the insulating films 47 and 48 of the step portion 49A is degraded, and electrostatic withstand voltage of the insulating film 47 or 48 may be lower than that of another portion. As a result, discharging more easily occurs between the scanning line test electrode 43b and the storage capacitance line feeding wiring 49 on the step portion 49A.

Therefore, generation of visible defects caused by an interlayer short-circuit formed by electrostatic breakdown damage can be reduced, and a manufacturing yield can be increased.

Figure 7:
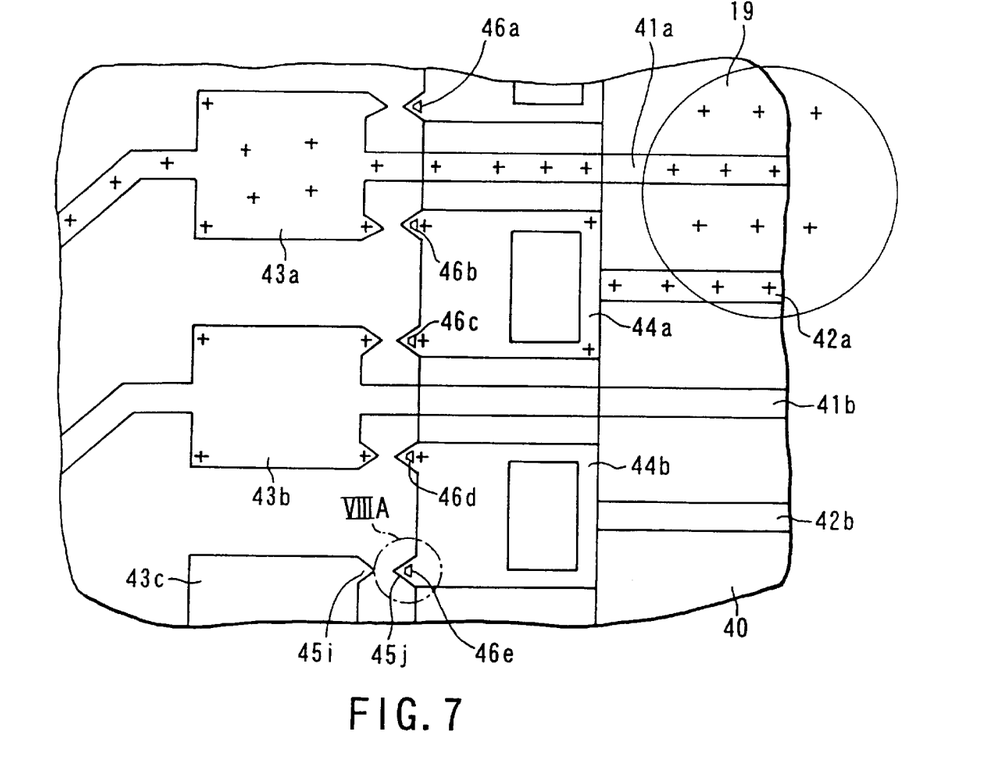
FIG. 7 is a plan view showing the planar structure in a manufacturing step of an array substrate according to another embodiment of this invention.

A case wherein the insulating projection portions 46a to 46e consisting of SiN shown in FIG. 1 according to the above embodiment are formed in self-alignment will be described below with reference to FIGS. 7 and 8. FIG. 7 is a plan view showing the insulating substrate 40 in the step corresponding to FIG. 1. FIG. 7 is different from FIG. 1 only in the portions corresponding to the insulating projection portions 46a to 46e. In FIG. 7, only the portion corresponding to the projection portion 46e enclosed by a circle VIIIA will be described. The same reference numerals as in FIG. 1 denote the other parts in FIG. 7, and a description thereof will be omitted.

Figure 8A:
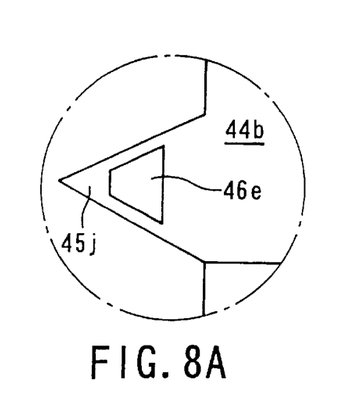
FIG. 8A is a plan view showing an enlarged portion inside a circle VIIIA in FIG. 7.

An enlarged portion in the circle VIIIA in FIG. 7 is shown in FIG. 8A. Referring to FIG. 8A, it is characterized that the short side of the insulating projection portion 46e consisting of SiN is almost parallel to the diagonal side of the projection portion 45j of the storage capacitance line test electrode 44b formed below the projection portion 46e.

Figure 8B:
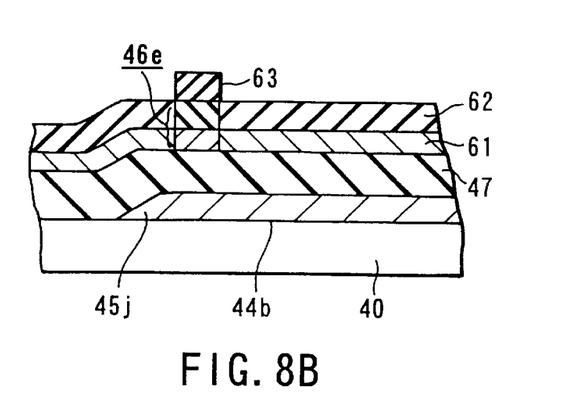
FIG. 8B is an enlarged sectional view showing the sectional structure of the portion inside the circle A in FIG. 7.

More specifically, in manufacturing, as shown in FIG. 8B, an a-Si film 61 is formed on the surface of the SiO film 47 in correspondence with the projection portion 45j of the storage capacitance line test electrode 44b formed on the surface of the glass substrate 40, and an SiN film 62 is formed on the a-Si film 61. Thereafter, a mask 63 having a planar shape corresponding to the projection portion 46e is formed by using a resist and etched to remove the SiN film 62 and the a-Si film 61, thereby leaving the projection portion 46e under the mask 63. Finally, the mask 63 is removed. The subsequent steps are the same as those in the above embodiment.

Figure 9:
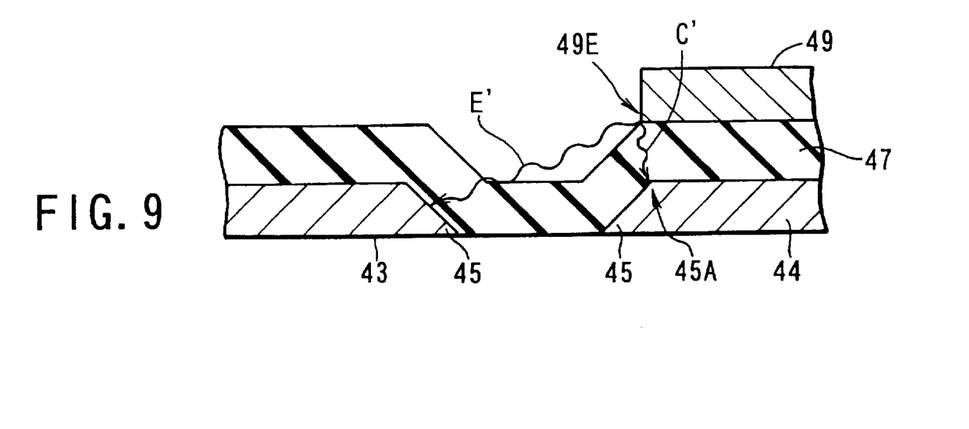
FIG. 9 is a view showing a partial sectional structure in a manufacturing step of an array substrate according to still another embodiment of the present invention.

In each of the above embodiments, a projection portion is formed by SiN, and a step portion is formed on the basis of it, when a storage capacitance line feeding electrode is formed on the projection portion. However, in place of the formation of the step portion, as shown in FIG. 9, an edge portion 49E at the lower end of the side surface of the storage capacitance line feeding wiring 49 may be close to a bent portion 45A at the upper end of a projection portion 45 of a storage capacitance line test electrode 441 which is just below the edge portion 49E, and may be arranged to oppose the projection portion 45 of a scanning line test electrode 43. In this manner, a discharging projection portion is substantially formed without forming a step portion, so that discharging paths C' and E' are formed as shown in FIG. 9.

Figure 10:
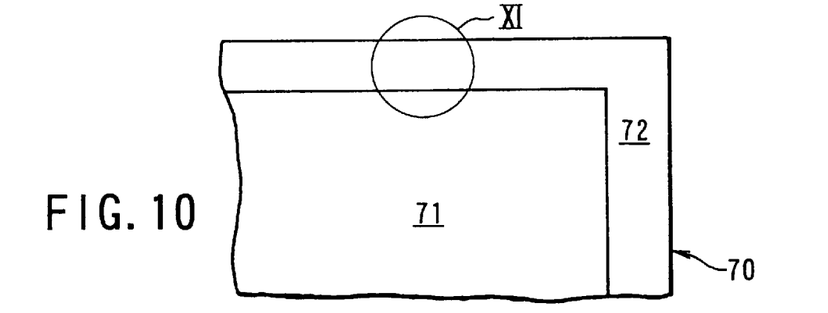
FIG. 10 is a plan view showing a planar structure in a manufacturing step of an array substrate according to further embodiment of this invention.
Figure 11:
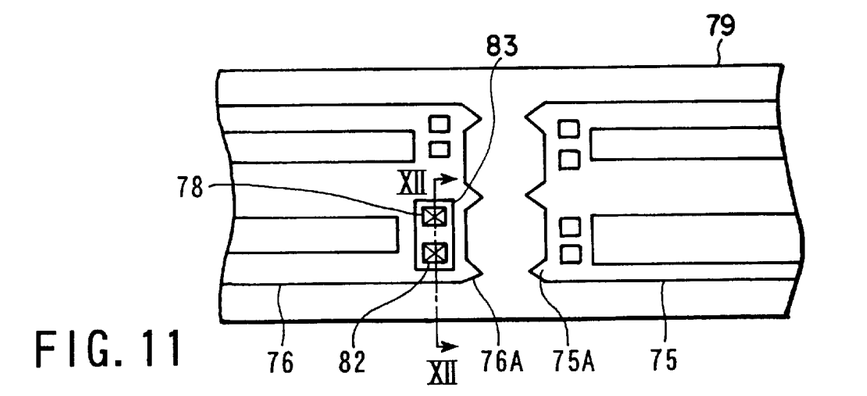
FIG. 11 is a plan view showing an enlarged portion inside a circle XI in FIG. 10.
Figure 12:
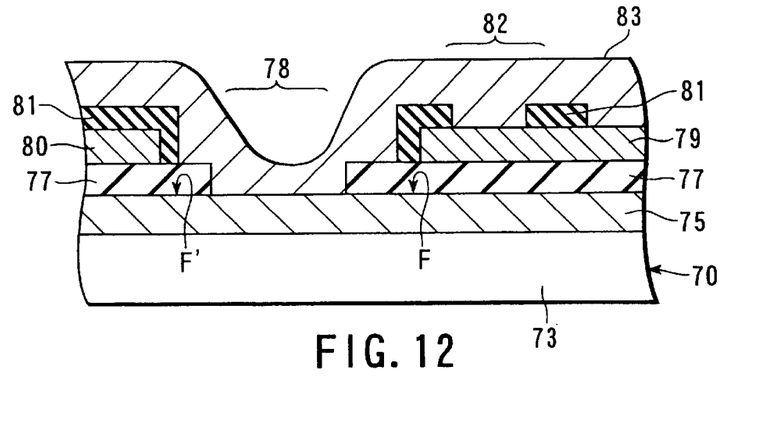
FIG. 12 is a sectional view showing the structure cut along a line XII—XII in FIG. 11 when viewed in the direction of arrows.

FIGS. 10 to 12 show still another embodiment of the present invention. In this embodiment, an interlayer discharging path similar to the interlayer discharging path of the above embodiment is formed on a wiring portion 72 provided for feeding a voltage from an array substrate 70. The wiring portion 72 is formed outside an image formation portion 71 of the array substrate 70 and is arranged to feed the voltage to a counter electrode on a counter substrate (not shown).

FIG. 11 is a plan view showing an enlarged portion enclosed by a circle XI in FIG. 10, and FIG. 12 is a sectional view of the portion along XII—XII line in FIG. 10.

Referring to FIGS. 11 and 12, a first feeding wiring layer 75 of a first layer is formed on a glass substrate 73. A discharging projection 75A is formed at the tip of the first feeding wiring layer 75. In addition, a second feeding wiring layer 76 having a discharging projection 76A is formed in the same first layer to be a predetermined distance apart from the discharging projection 75A. For example, the first layer is formed in the same step during the scanning line is formed.

An insulating interlayer 77 is formed on the first and second feeding wiring layers 75 and 76 formed in the first layer. A contact hole 78 for exposing the first feeding wiring layer 75 of the first layer is formed in the insulating interlayer 77. Feeding wiring layers 79 and 80 of the second layer are formed on the insulating interlayer 77, and insulating layers 81 are formed on the feeding wiring layers 79 and 80. A contact hole 82 for exposing the feeding wiring layer 79 is formed in the insulating layer 81 formed on the feeding wiring layer 79 serving as one feeding wiring layer of the second layer, and the resultant structure is entirely covered with a conductive film 83 of the third layer to connect the contact holes 78 and 82 to each other. The second layer is formed in the same step as the signal line and third layer is formed in the same step as the pixel electrode, respectively.

FIG. 12 is a sectional view of the portion cut along a XII—XII line in FIG. 11 when viewed in the direction of arrows.

Here, after the resultant structure is entirely covered with the conductive film 33 of the third layer, the first feeding wiring layer 75 of the first layer and the feeding wiring layers 79 and 80 of the second layer are connected to each other. For this reason, static electricity of a high voltage is charged on the feeding wiring layer 75 of the first layer and the feeding wiring layers 79 and 80 of the second layer in a manufacturing step without any problem.

On the other hand, before the structure is covered with the conductive film 83 of the third layer, when static electricity of a high voltage is charged on the feeding wiring layer 75 of the first layer or the feeding wiring layers 79 and 80 of the second layer, discharging occurs between the plurality of discharging projections 75A and 76A of the first and second feeding wiring layers 75 and 76 formed in the first layer, or discharging occurs, through the insulating interlayer 77, between the first and second feeding wiring layers 75 and 76 formed in the first layer and the feeding wiring layers 79 and 80 of the second layer.

For example, in FIG. 12, when a high voltage is applied across the first feeding wiring layer 75 formed in the first layer and the feeding wiring layers 79 and 80 of the second layer, discharging paths F and F' are formed between the first feeding wiring layer 75 and the edge portions of the end portions of the feeding wiring layers 79 and 80 of the second layer, so that discharging is safely performed.

The present invention is also effective when scanning lines and signal lines are electrically connected to a short ring through variable conductance element formed like TFTs respectively arranged on pixels.

Figure 13:
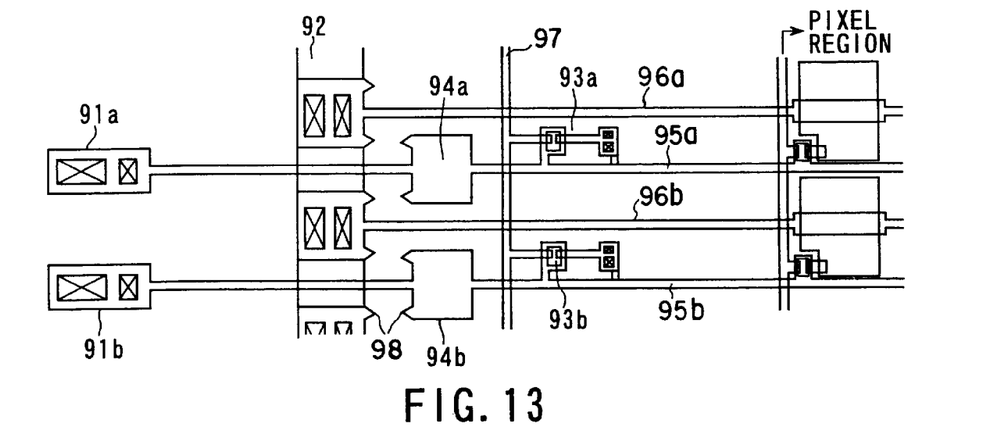
FIG. 13 is a plan view showing a planar structure of an array substrate according to a still further embodiment of the present invention in a manufacturing step.

FIG. 13 shows an uncompleted structure of an array substrate at a manufacturing step according another embodiment of the present invention. In the figure, scanning line feeding electrodes 91a, 91b are connected to scanning lines 95a, 95b via scanning line test electrodes 94a, 94b, respectively. Storage capacitance line feeding electrodes 92 is commonly connected to storage capacitance lines 96a, 96b. FIG. 13 shows a state wherein scanning line layer including scanning lines 95a, 95b and gates of TFTs 93a, 93b are just formed. Therefore, the scanning lines 95a, 95b are not connected to signal line 97 through short-ring TFTs 93a, 93b which are to be completed in a later manufacturing step. Therefore, the lines 95a, 95b and the line 97 are not connected with each other at this stage.

In order to prevent the undesired breakdown damage at this manufacturing step, the structure shown in FIG. 13 includes discharging projections 98 formed on the storage capacitance line feeding electrode 92 and the scanning line test electrodes 94a, 94b. The electrodes 92 and 94a, 94b are formed in different manufacturing steps and an insulating layer (not shown) is formed between these electrodes 92 and 94a, 94b.

Therefore, until the short-ring TFTs 93a, 93b are completed, unnecessary charges can be discharged through the projections 98 in the similar manner as in the foregoing embodiments, so that a short circuiting at crossing points of lines 95a, 95b and line 92 can be prevented effectively.

Figure 14:
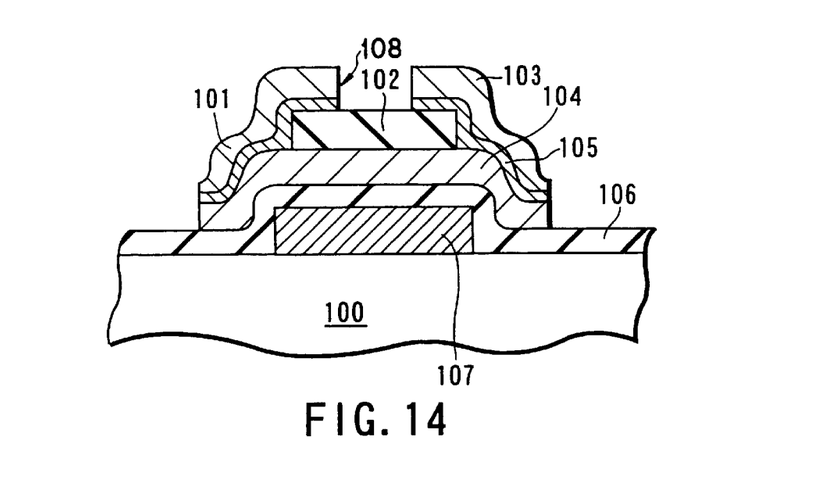
FIG. 14 is a sectional view showing a structure of a switching element formed in an array substrate according to the present invention.

FIG. 14 shows an example structure of a TFT switching element to be connected between a signal line and a pixel electrode in the display device according to the present invention. In the figure, a gate electrode 107 is formed on a surface of a glass substrate 100. Scanning lines (not shown) connected to the gate electrode 107 are formed in the same layer. The entire surface of the substrate 100 including the gate electrode 107 is covered with a gate insulation layer 106 on which a-Si semiconductor layer 104 is formed.

An ohmic contact layer 105 is coated on the semiconductor layer 104 with an etching protection layer 102 being formed between the layers 104 and 105 at a portion where an etching hole 108 can be formed in the later step, so as to form source electrode 101 and drain electrode 103 over the gate electrode 107. The etching protection layer 102 is formed in a manufacturing step in which the discharging projection portions are formed. Thus, a TFT switching element is completed on the substrate 100.

As has been described above, according to the present invention, in a region in which a scanning line layer and a signal line layer which are electrically insulated from each other and laminated overlap, e.g., a region outside a pixel electrode formation region, a projection portion for inducing discharging of electrostatic charges can be formed, by forming a step portion on an insulating film between both the layers. The discharging can be performed in a vertical direction between opposing electrodes through the insulating film. As a result, there can be provided an electrode wiring board and a display device using the electrode wiring board, in which generation of visible defects being caused by electrostatic breakdown damage can be reduced, and a manufacturing yield can be increased.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display device comprising:
a pixel electrode array substrate including a display region and an outside region, the display region having a plurality of scanning lines formed on an insulating substrate, an insulating layer formed on said scanning lines, signal lines arranged on said insulating layer in a direction crossing over said scanning lines via the insulating layer, and pixel electrodes arranged at each crossing portion of said plurality of scanning lines and said signal lines through said insulating layer, and the outside region having a plurality of first wirings connected to said plurality of scanning lines formed on the insulating substrate, at least one additional insulating stepped member formed on said insulating layer, and a plurality of second wirings connected to said plurality of signal lines and formed in a direction crossing over said first wirings via the insulating layer and said additional insulating stepped member;
a counter substrate opposing said pixel electrode array substrate; and
a light modulation layer held between said pixel electrode array substrate and said counter substrate,
wherein each of said first wirings includes a first discharging portion of each of said second wirings includes a second discharging portion formed on said additional insulating stepped member, and the second discharging portion has at least one stepped portion corresponding to said additional insulating stepped member and acting as a discharging edge at a position opposing said first discharging portion through the insulating layer.

2. A display device according to claim 1, wherein said stepped portion of said second discharging portion is formed to have a strip-like shape including a side edge portion which is formed as said discharging edge in a direction along said second wiring.

3. A display device according to claim 1, wherein said first wirings and said second wirings each has a discharging projection portion.

4. A display device according to claim 1, wherein said stopped portion of second discharging portion formed on said insulating layer has an edge facing said first wiring via said insulating layer at a position corresponding to a side surface of said additional insulating stepped member.

5. A display device according to claim 4, wherein said additional insulating stepped member has a height of not less than 1,000 Angstroms.

6. A display device according to claim 5, wherein said additional insulating stepped member has a height of 2,000 Angstroms to 3,300 Angstroms.

7. A display device according to claim 4, wherein said additional insulating stopped member is formed in the same manufacturing step as a step of forming an insulation etching protective film used to form switching elements connected between said signal line and said pixel electrode.

* * * * *